United States Patent
Sherman et al.

(10) Patent No.: US 11,323,519 B2
(45) Date of Patent: May 3, 2022

(54) INTERNET OF THINGS PUB-SUB DATA PUBLISHER

(71) Applicant: Microsoft Technology Licensing, LLC, Redmond, WA (US)

(72) Inventors: Gary Sherman, Munich (DE); Hans Gschoßmann, Munich (DE); Erich Barnstedt, Munich (DE); Martin Regen, Munich (DE); Marc Schier, Munich (DE); Daniele Colonna, Munich (DE)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 660 days.

(21) Appl. No.: 15/491,605

(22) Filed: Apr. 19, 2017

(65) Prior Publication Data
US 2018/0309831 A1    Oct. 25, 2018

(51) Int. Cl.
  *H04L 29/08*    (2006.01)
  *H04L 29/12*    (2006.01)
  *H04L 29/06*    (2006.01)
  *H04L 12/66*    (2006.01)
  *H04L 67/125*   (2022.01)
  (Continued)

(52) U.S. Cl.
  CPC ............ *H04L 67/125* (2013.01); *H04L 12/66* (2013.01); *H04L 61/157* (2013.01); *H04L 67/16* (2013.01); *H04L 67/26* (2013.01); *H04L 67/42* (2013.01); *H04L 69/18* (2013.01)

(58) Field of Classification Search
  CPC ....... H04L 67/125; H04L 67/16; H04L 67/42; H04L 61/157; H04L 67/26; H04L 12/66; H04L 69/18
  See application file for complete search history.

(56) References Cited

U.S. PATENT DOCUMENTS 7,246,194 B2 *  7/2007  Train ................. G05B 19/4186
                                              710/305
7,949,704 B2 *  5/2011  Jones ...................... G06F 9/542
                                              709/201
(Continued)

FOREIGN PATENT DOCUMENTS

CN          105075224 A       11/2015
WO     WO-2009083091 A2 *     7/2009  .......... H04L 67/125
(Continued)

OTHER PUBLICATIONS

OPC Unified Architecture Specification Part 14: PubSub Release Candidate 1.04.24, OPC Foundation, Feb. 9, 2017 (Year: 2017).*
(Continued)

*Primary Examiner* — David R Lazaro
*Assistant Examiner* — Robert A Shaw
(74) *Attorney, Agent, or Firm* — Mannava & Kang, P.C.

(57) ABSTRACT

An Internet of Things (IoT) system may include a publisher computer connected to IoT devices. The publisher computer may execute operations to provide data for the IoT devices to a remote computer which may be included in a cloud infrastructure. The publisher computer can receive data from the IoT devices, convert the data to a publisher-subscriber format that conforms to a predetermined specification, and transmit the data to the cloud infrastructure or other remote computers.

17 Claims, 4 Drawing Sheets

(51) Int. Cl.
  *H04L 67/55* (2022.01)
  *H04L 61/4557* (2022.01)
  *H04L 67/01* (2022.01)
  *H04L 67/51* (2022.01)
  *H04L 69/18* (2022.01)

(56) References Cited

U.S. PATENT DOCUMENTS

| | | | | |
|---|---|---|---|---|
| 8,234,384 | B2* | 7/2012 | Fisher | G05B 9/03 370/338 |
| 9,330,190 | B2* | 5/2016 | Sundstrom | G06F 16/958 |
| 10,079,865 | B2* | 9/2018 | McDaid | G05B 19/4186 |
| 2002/0116453 | A1* | 8/2002 | Todorov | H04L 41/0853 709/203 |
| 2010/0281097 | A1* | 11/2010 | Mahnke | H04L 12/403 709/201 |
| 2010/0306313 | A1* | 12/2010 | Mahnke | G06F 9/466 709/203 |
| 2013/0231190 | A1* | 9/2013 | Rajaraman | H04L 67/2823 463/42 |
| 2014/0201321 | A1* | 7/2014 | Donaghey | H04L 67/2823 709/217 |
| 2014/0286354 | A1* | 9/2014 | Van De Poel | G06F 9/542 370/463 |
| 2015/0051714 | A1* | 2/2015 | Romanik | G05B 11/01 700/2 |
| 2015/0058925 | A1* | 2/2015 | Curry | H04L 63/08 726/3 |
| 2015/0156252 | A1* | 6/2015 | Volkmann | H04L 12/185 709/203 |
| 2015/0207857 | A1* | 7/2015 | Horton | H04L 67/16 709/204 |
| 2016/0014210 | A1* | 1/2016 | Thomas | H04L 67/1002 709/227 |
| 2016/0248871 | A1* | 8/2016 | Seed | H04L 12/403 709/201 |
| 2017/0060574 | A1* | 3/2017 | Malladi | G06F 8/70 |
| 2017/0102691 | A1* | 4/2017 | Sait | G05B 19/41855 |
| 2017/0180277 | A1* | 6/2017 | Brady | H04L 51/066 |
| 2017/0277521 | A1* | 9/2017 | Sharma | G06F 9/4498 |
| 2017/0277560 | A1* | 9/2017 | Lucas | G06F 9/4498 |
| 2017/0277800 | A1* | 9/2017 | Lucas | G06F 9/4498 |
| 2017/0300043 | A1* | 10/2017 | Deiretsbacher | G05B 19/4186 |
| 2018/0024537 | A1* | 1/2018 | Chauvet | G06F 9/455 718/104 |
| 2018/0026942 | A1* | 1/2018 | De Ligt | G05B 19/41855 709/245 |
| 2018/0059921 | A1* | 3/2018 | De Ligt | G06F 3/04847 |
| 2018/0088541 | A1* | 3/2018 | Sangi | F22B 35/18 |
| 2018/0107230 | A1* | 4/2018 | Sai | G05D 7/06 |
| 2018/0143961 | A1* | 5/2018 | Thomas | H04L 65/4015 |
| 2018/0167476 | A1* | 6/2018 | Hoffner | H04L 67/1002 709/227 |
| 2018/0213378 | A1* | 7/2018 | Brown | H04L 12/185 709/203 |
| 2018/0248980 | A1* | 8/2018 | Gotz | H04L 67/104 |
| 2018/0270310 | A1* | 9/2018 | Venkatesan | H04L 67/104 |
| 2018/0299873 | A1* | 10/2018 | Chauvet | G05B 19/4185 |
| 2018/0316729 | A1* | 11/2018 | Chauvet | G06F 9/455 718/104 |
| 2019/0289091 | A1* | 9/2019 | Burns | H04L 41/0853 709/203 |

FOREIGN PATENT DOCUMENTS

| | | | |
|---|---|---|---|
| WO | 2016171527 A1 | 10/2016 | |
| WO | WO-2018093351 A | * 5/2018 | H04L 67/125 |

OTHER PUBLICATIONS

Jerker Delsing, Ed. IOT Automation—Arrrowhead Framework, CRC Press 2017 (Year: 2017).*

OPC Foundation, OPC UA Specification: Part 4—Services, Release Candidate 1.04.11 (Feb. 9, 2017) (Year: 2017).*

OPC Foundation, OPC Unified Architecture Specification Part 14: PubSub Release Candidate 1.04.24, Feb. 9, 2017 (Year: 2017).*

S. Cavalieri et al, "A web-based platform for OPC UA integration in IIoT environment," 22nd IEEE International Conference on Emerging Technologies and Factory Automation (ETFA), pp. 1-6 (Year: 2017).*

W.Mahnke, S.H.Leitner, M.Damm, "OPC Unified Architecture", Springer Verlag, 2009 (Year: 2009).*

Fernbach et al Interoperability at the Management Level of Building Automation Systems:A Case Study for BACnet and OPC UA, IEEE ETFA '2011 (Year: 2011).*

Sande et al, OPC UA Based Solutions for Integrated Operations. In: A. Kwiecieh, P. Gaj, and P. Stera (Eds.): CN 2010, CCIS 79. Springer, pp. 76-83 (Year: 2010).*

Oksanen et al, Remote access of ISO 11783 process data by using OPC Unified Architecture technology, Computers and Electronics in Agriculture 117 (2015) p. 141-148 (Year: 2015).*

Stopper & Katalinic, Service-oriented Architecture Design Aspects of OPC UA for Industrial Applications, Proceedings of the International MultiConference of Engineers and Computer Scientists 2009 vol. II, IMECS 2009, (Year: 2009).*

Sande et al, OPC UA Based Solutions for Integrated Operations, CN 2010, CCIS 79, Springer-Verlag Berlin Heidelberg, pp. 76-83, 2010 (Year: 2010).*

Seilonen et al Aggregating OPC UA Servers for Monitoring Manufacturing Systems and Mobile Work Machines, IEEE, 2016 (Year: 2016).*

Luo et al—OPC UA-based Smart Manufacturing: System Architecture, Implementation, and Execution, 2017 5th International Conference on Enterprise Systems (Year: 2017).*

Schmitt et al, Cloud-enabled Automation Systems using OPC UA: Extension and Evaluation of Communication in OPC UA, Hauptbeitrag I Automation 2014 (Year: 2014).*

Corsaro, DDS & OPC-UA Explained, PrismTech, 2016 (Year: 2016).*

S. Cavalieri et al, A web-based platform for OPC UA integration in IIoT environment, IEEE, 2017 (Year: 2017).*

S. Cavalieri et al, Integration of OPC UA into a Web-based Platform to enhance interoperability, IEEE 2017, p. 1206-1211 (Year: 2017).*

"Unified Automation UA Gateway", https://web-beta.archive.org/web/20150307201759/http://documentation.unified-automation.com/uagateway/1.3.1/readme.txt, Published on: Mar. 7, 2015, 5 pages.

Wolin, et al., "CMSG—A Publish/Subscribe Interprocess Communication Package", In Proceedings of International Workshop on Personal Computers and Particle Accelerator Controls, Oct. 20, 2008, pp. 28-30.

Schmitt, et al., "Cloud-enabled Automation Systems using OPC UA", In Publication of ATP Edition, Jul. 2014, pp. 34-40.

Wang, et al., "OPC UA Message Transmission Method over CoAP", https://tools.ietf.org/html/draft-wang-core-opcua-transmission-00, Published On: Jan. 25, 2017, 8 pages.

"OPC Foundation Announces Support of Publish / Subscribe for OPC UA", Retrieved From: https://opcfoundation.org/news/opc-foundation-news/opc-foundation-announces-support-of-publish-subscribe-for-opc-ua/, Apr. 6, 2016, 4 Pages.

"OPC UA Pub-Sub", Retrieved From: https://jp.opcfoundation.org/wp-content/uploads/sites/2/2016/12/OPCDay2016-2-OPC_UA_Pub-Sub_model.pdf, Dec. 9, 2016, 20 Pages.

Matthias, Damm, "OPC Day Finland 2016 OPC Day Finland 2016", Retrieved From: https://www.automaatioseura.fi/site/assets/files/1552/matthias_damm_opcdayfinland2016_opc-ua-update.pdf, Dec. 31, 2016, 26 Pages.

"International Search Report and Written Opinion Issued in PCT Application No. PCT/US18/026368", dated Jun. 19, 2018, 10 Pages.

"First Office Action Issued in Chinese Patent Application No. 201880025204.7", dated Aug. 24, 2021, 28 Pages.

* cited by examiner

INTERNET OF THINGS PUB-SUB DATA PUBLISHER

BACKGROUND

Internet of Things (IoT) is one of the most significant trends in technology. IoT typically involves a network of interconnected devices that may collect and exchange data, making them responsive for various applications. IoT may be applied to many different environments and for many different applications, such as automotive, energy, healthcare, transportation, manufacturing, etc.

IoT may rely on existing technologies to facilitate the collection and exchange of data between devices. For example, IoT may utilize existing hardware and software for devices to facilitate data collection and storage, processing, and other device operations. Also, communication infrastructure, which may include protocols and communication technologies, may be used for data exchange.

Also, protocols and standards are available and are currently being developed for IoT. One such standard is the Open Platform Communications Unified Architecture (OPC UA), which includes machine-to-machine communication protocols that may be used for industrial automation or other applications. OPC UA is a standard developed by the OPC Foundation, which is an industry consortium that creates and maintains standards for open connectivity of industrial automation devices. OPC UA was initially released in 2008 but the most recent version was released in 2015. Newer versions will be released to accommodate emerging needs of industrial automation.

OPC UA is commonly used for communicating with industrial equipment and systems for data collection and control for Industrial IoT (IIoT). Some examples of industries utilizing OPC UA include pharmaceutical, oil and gas, building automation, industrial robotics, security, and manufacturing and process control. OPC UA can be used to provide platform independent, secure, reliable, and semantic interoperability between sensors, field devices, controllers, and applications at the shop-floor level in real-time as well as between the shop floor and the cloud. OPC UA is cross-platform and includes a service-oriented architecture (SOA). Also, OPC UA utilizes an information model for modeling data into a OPC UA namespace. The information model facilitates the collection and exchange of data between devices, and further facilitates utilization of the SOA of OPC UA.

The OPC UA may evolve to provide additional functionality, and to implement the additional functionality, the OPC UA software of the devices should be updated. However, updating the OPC UA software on the devices may cause the devices to be non-operational for a period of time. In many instances, the devices that are programmed to use OPC UA to process and exchange data are designed to be continually operational for performing their primary functions. For example, OPC UA is commonly used in factories to monitor and control operations performed by robots on the factory floor. The robots are designed to run twenty-four hours a day, seven days a week. Any down-time can cause a disruption and unwanted delay in the manufacturing operations of the factory. Accordingly, updating OPC UA software on this type of device can be disruptive to the primary operations of the device.

BRIEF DESCRIPTION OF DRAWINGS

Embodiments and examples of the present disclosure are described in detail in the following description with reference to the following figures in which like reference numerals indicate similar elements.

DETAILED DESCRIPTION

Figure 1:
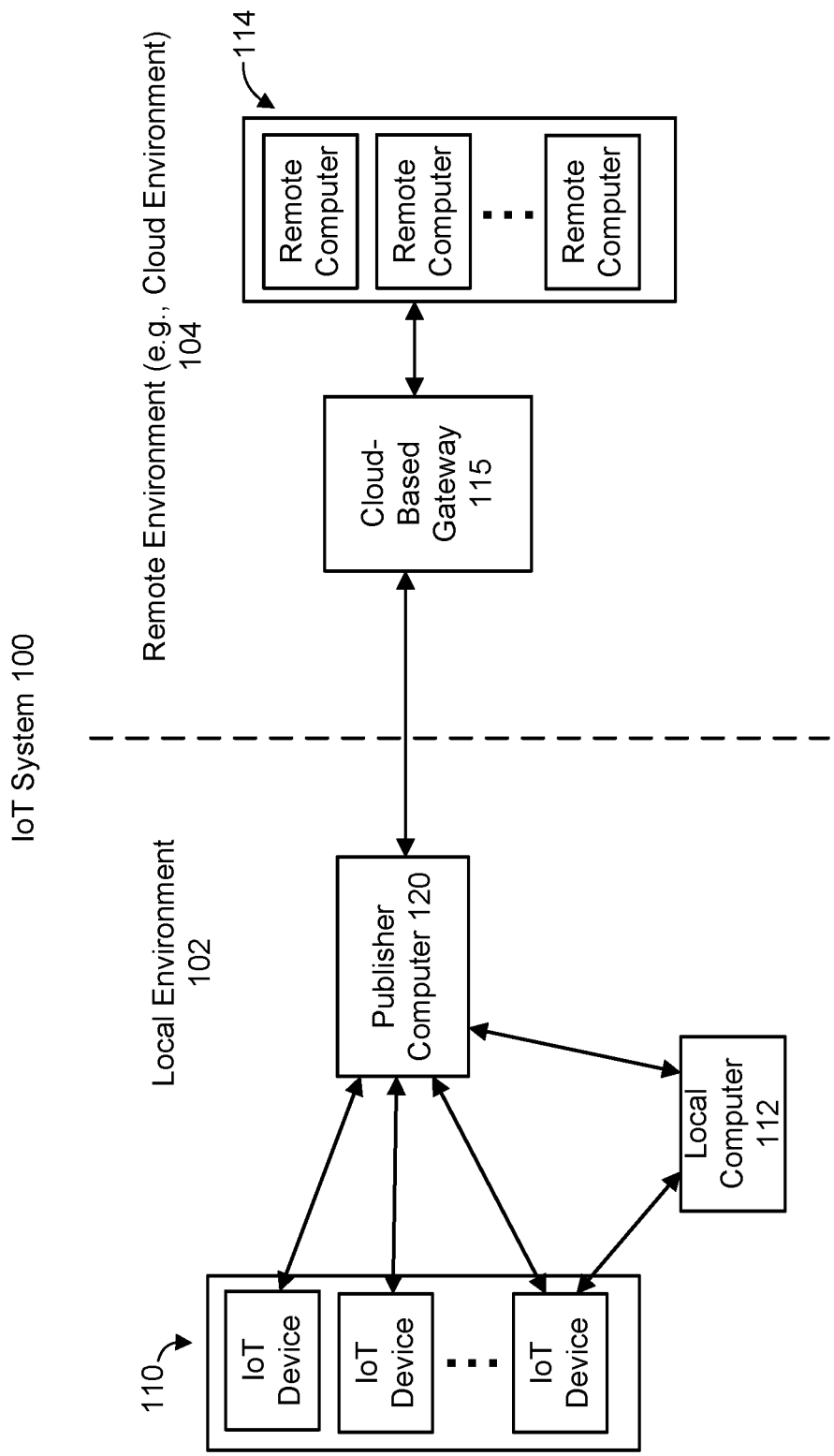
FIG. 1 illustrates an IoT system, according to an example of the present disclosure.

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

The examples of the present disclosure relate to IoT devices and providing data from IoT devices to other computers and devices. For example, a publisher computer is connected to the IoT devices. The IoT devices may include sensors, field devices, controllers, applications, or any computer or device that can generate data to be exchanged with other computers. The publisher computer may include an IoT gateway connecting the IoT devices to cloud infrastructure. The publisher computer can receive data from the IoT devices, convert the data to a publisher-subscriber format that conforms to a predetermined specification, and transmit the data to the cloud infrastructure and/or other remote computers.

According to an example of the present disclosure, the publisher computer and the IoT devices are OPC UA devices that operate in conformance with the OPC UA standard. The IoT devices may be part of an industrial automation system or may be provided in another environment. In accordance with OPC UA, the IoT devices may include OPC UA servers that expose data generated by the IoT devices in an "address space", and this data can be accessed by authorized OPC UA clients that can see what data is available through the address space to choose what data to receive from the OPC UA servers.

The current version of OPC UA, version 1.03, specifies a client-server communication model for the data exchange between OPC UA clients and OPC UA servers. In the client-server communication model, an OPC UA client generally sends a request for data to an OPC UA server, and then, the OPC UA server may respond to the request by providing the requested data to the OPC UA client. For example, an OPC UA client creates an individual session, subscription and monitored items to retrieve data from the OPC UA server in a one-to-one manner. Sessions are used to manage the communication relationship between the OPC UA client and the OPC UA server, and the monitored items represent the settings used to subscribe to events and variable value data changes from the OPC UA server. Monitored items may be grouped in a subscription. Data that is provided by an OPC UA server is transmitted to each OPC UA client individually that has a session with the OPC UA server and a subscription for the data. Resource constraints limit the number of parallel client-server connections, subscriptions, and monitored items, which can negatively impact clients that continuously need data from a larger number of servers. The client-server communication model specifies a format, such as the OPC binary UA encoding format, and a transport protocol, such as transmission control protocol/Internet protocol (TCP/IP), for transmitting data.

An anticipated new version of OPC UA that is yet to publish is being advertised as including a publish-subscribe (pub-sub) communication model which supports one-to-many data exchanges. For the proposed OPC UA pub-sub communication model, OPC UA applications do not directly exchange requests and responses. Instead, publishers, such as OPC UA servers, send messages to a message oriented middleware to publish data, without knowledge of subscribers, and subscribers, such as OPC UA clients, may receive the data through the message oriented middleware without knowledge of the publishers. The message oriented middleware is software or hardware infrastructure supporting sending and receiving messages between distributed systems. The OPC UA pub-sub communication model may send its data connectionless to OPC UA clients without the need for a resource consuming connection, and it is anticipated that the pub-sub model will facilitate faster response times to send data from the IoT devices to the cloud. IIoT systems may include thousands of sensors sending data to the cloud. The pub-sub communication model specifies a format, such as a JavaScript Object Notation (JSON) encoding format, and a transport protocol, such as an Advanced Message Queuing Protocol (AMQP) transport protocol, for transmitting data.

To reap the advantages of the OPC UA pub-sub communication model, IoT devices, including devices such as robots, manufacturing machines, etc., may need to be upgraded with new OPC UA software that facilitates use of the OPC UA pub-sub specification. This may lead to downtime of the IoT devices. According to an example of the present disclosure, the IoT devices may send data to the publisher computer using a current communication model (e.g., the client-server communication model) of the OPC UA, and the publisher computer executes processes to convert the data to conform to the OPC UA pub-sub communication model. The data may then be transmitted to the cloud or other remote computers according to the OPC UA pub-sub communication model. Accordingly, the IoT system may take advantage of the pub-sub communication model without having to alter the communication software, such as the OPC UA server software, of the IoT devices publishing the data. Also, the publisher computer, which may include an IoT gateway to the cloud, may be updated without downtime to change the data subscribed to by a destination.

FIG. 1 illustrates an IoT system, referred to as system 100, according to an example of the present disclosure. The system 100 may include a local environment 102, including IoT devices 110, connected to a remote environment 104, including remote computers 114. The IoT devices 110 may exchange data with other computers, including the remote computers 114 and local computers, such as the local computer 112. The IoT devices 110 can interact with publisher computer 120, which can perform pub-sub operations and IoT gateway operations, to communicate with the remote environment 104, including a cloud-based gateway 115 and/or the remote computers 114.

The remote environment 104 may include a cloud environment that can provide cloud services. The remote environment 104 may include the cloud-based gateway 115 that ingests the data from the local environment 102, including data from the IoT devices 110. The remote environment 104 may include cloud resources, including the remote computers 114 and/or other cloud infrastructure that can receive the data from the IoT devices and execute applications, such as analytic applications, that analyze or utilize the data. For example, the analytics may determine insights from the data, and the insights may be used to control operations of machines in the local environment 102.

In an example, the local environment 102 may include a manufacturing environment comprising a manufacturing production facility including the IoT devices 110, which may include sensors, robots and other types of manufacturing machines. The IoT devices 110 may send data about the manufacturing operations that are being performed in the manufacturing production facility to the remote computers 114 via the publisher computer 120 and the cloud-based gateway 115. The data may include gigabytes of data produced by assembly line sensors, and the publisher computer 120 may include modules to send the data according to a predetermined communication model. The remote computers 114 may receive IoT data (e.g., data from IoT devices 110) from multiple manufacturing production facilities, and compare the IoT data to predict or detect manufacturing errors and to remediate the errors. In another example, the local environment 102 may include a smart building environment, and the IoT devices 110 may include smart sensors monitoring water, heat, and electricity usage. The remote computers 114 may analyze the IoT data from the smart sensors to proactively optimize usage of energy resources. In another example, the local environment 102 may include a retail environment, and the IoT devices 110 may include real-time inventory tracking and sale systems. The remote computers 114 may analyze the IoT data from these systems to provide efficient product delivery options and to monitor purchase behavior and facilitate promotions.

The local environment 102 may be connected to the remote environment 104 via a network. The network may include one or more of the Internet, an intranet, a Local Area Network (LAN), a wireless LAN (WiLAN), a Wide Area Network (WAN), a Metropolitan Area Network (MAN), a Public Switched Telephone Network (PSTN), a Wireless Personal Area Network (WPAN) and other types of wired and/or wireless communications networks. The remote environment may include a cloud environment including comprising distributed cloud resources. The cloud environment may include a shared pool of configurable computing resources (e.g., networks, servers, storage, applications, and services) that are provisioned as needed. The IoT devices 110 may also be connected to the publisher computer 120 and other computers via a network, which may include one or more of the networks described above. As is further discussed below, the IoT devices 110, the local computer 112 and the publisher computer may exchange data via a first communication model, such as a client-server model. The publisher computer 120 may communicate with remote computers 114 and the cloud-based gateway 115 according to a second, different communication model, such as the pub-sub communication model. Both communication models may be described in an OPC UA standard or versions of the OPC UA standard to be released.

It will be apparent to one of ordinary skill in the art that the local environment 102 may include IoT devices 110 and computers other than shown. An IoT device may include any computing device that connects to a network and has the ability to transmit data with other devices and computers, for example, according to an IoT standard, such as OPC UA. The local environment 102 may include IoT devices that are part of a scenario in which the IoT devices talk to other IoT devices to automate operations. The remote environment 104 is shown by way of example and not limitation as being connected to the local environment 102 via the cloud-based gateway 115, and the cloud-based gateway 115 may facilitate data exchange between the environments by providing cloud-to-device communication options, built-in declarative message routing, queryable storage for device metadata and synchronized state information, secure communications and access control, extensive monitoring for device connectivity, etc. Also, the publisher computer 120 may perform IoT gateway operations to connect the local environment 102 to the remote environment 104. For example, the publisher computer 120 may perform protocol adaptation. For example, the cloud-based gateway 115 and the publisher computer 120 support communication over the Message Queue Telemetry Transport (MQTT), AMQP, and Hypertext Transfer Protocol (HTTP) protocols. The publisher computer 120 can bridge traffic between devices and computers, such between the IoT devices 110, and the cloud-based gateway 115 and/or the remote computers 114. In an example, the publisher computer 120 includes an IoT gateway software development kit (SDK) that include modules to perform various gateway operations, and the modules may be customized.

Figure 2:
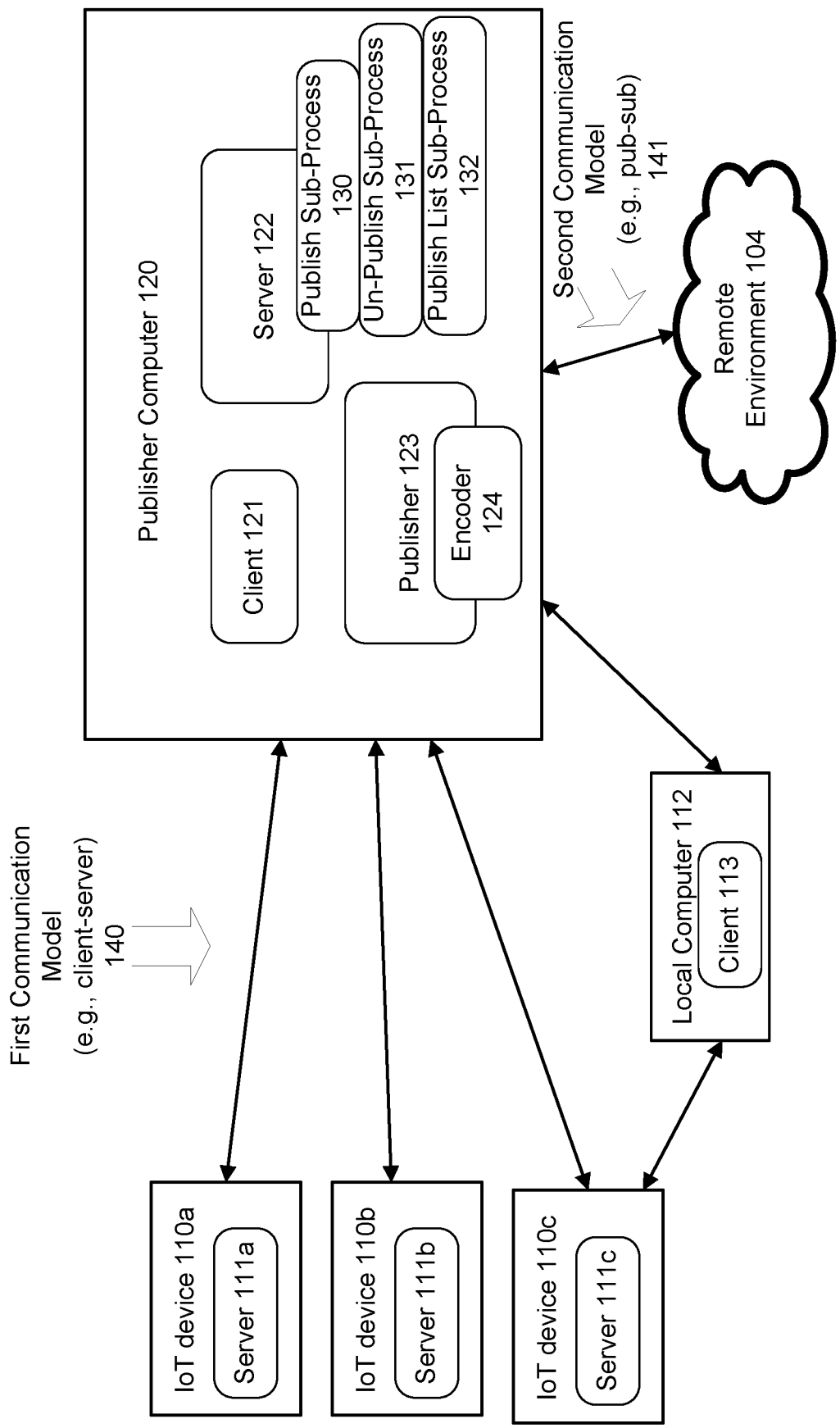
FIG. 2 illustrates a publisher computer, according to an example of the present disclosure.

FIG. 2 shows a block diagram of the publisher computer 120 and other components of the system 100. The system 100 may include clients and servers. A client may include a software application that gets data from a server, and the server may include a software application that provides the data. In an example, the clients may be OPC UA clients and the servers may include OPC UA servers that conform to the OPC UA standard. The clients and servers may be hosted on computers which may include the IoT devices 110 or may include computers connected to the IoT devices 110. For example, the IoT devices 110a-c may include servers 111a-c (e.g., OPC UA servers) or be connected to computers hosting servers 111a-c to provide data to clients (e.g., OPC UA clients), such as client 121 and client 113. The data may include IoT data captured or measured by the IoT devices 110 or other data about the local environment 102. The servers 111a-c may be referred to as remote servers with respect to the publisher computer 121, and may be hosted on a different computer than the publisher computer 121. The local computer 112 may include the client 113 to subscribe to data from one or more of the IoT devices 110. For example, the client 113 subscribes to data from the server 111c to receive data from the IoT device 110c. By way of example, the local computer 112 may include a laptop or another type of computer used by a factory worker to view data from the IoT devices 110 and manage the IoT devices 110. For example, the IoT devices 110 may include sensors, factory machines, etc., and the client 113 may subscribe to data from the servers 111a-c. The factory worker may view the data via the local computer 112 or the local computer 112 may execute applications that utilize data from the IoT devices 110 to control factory machines.

The publisher computer 120 may include client 121 and server 122. The server 122 may execute sub-processes 130-132 to perform various operations to capture data from the servers 111a-c via the client 121 according to a first communication model 140 and convert the data into a second communication model 141 for transmission to the remote environment 104, such as remote computers 114, or other computers. Publisher 123 may include an encoder 124 for encoding data from the servers 111a-c according to the second communication model 141. In an example that is further discussed below, the first communication model 140 may include a client-server model to get the data (e.g., IoT data from the IoT devices 110) from the servers 111a-c. Also, the data transmitted from the servers 111a-c to the clients 113 may be encoded according to the OPC UA binary format and may be transmitted over the TCP transport protocol specified in the OPC UA. Also, the second communication model may be the OPC UA pub-sub communication model whereby data is encoded according to a JSON format and transmitted over an AMQP transport protocol to the remote environment 104, such as the cloud-based gateway 115, remote computers 114, or other computers.

The sub-processes 130-132 may include publish sub-process 130, un-publish sub-process 131, and publish list sub-process 132. The sub-processes 130-132 are referred to as sub-processes because the publisher may perform a variety of other processes. Generally, the sub-processes are processes that may be performed by a computer executing machine readable instructions. The publish sub-process 130 identifies the specific data to retrieve from one or more of the servers 111a-c. For example, the IoT devices 110 may include sensors measuring multiple variables, such as temperature, pressure, volume, etc. One or more of the variables may be selected to be received by the publish sub-process 130. Also, assume a set of variables has been selected, but the set needs to be changed. The un-publish sub-process 131 may be used to select one or more variables to remove from the set so those variables are no longer received. The publish list sub-process 132 may be selected to determine the current set of data or variables that are being received from a server for a particular client. Any of the sub-processes 130-132 may be selected by a user via a user interface for accessing the server 122 or may be selected by an application or another process interacting with the server 122. Also, the server 122 interacts with the client 121 to get the data from the servers 111a as is further discussed below. After the server 122 gets the data, the publisher 123 may execute the encoder 124 to encode the data to the predetermined format and to transmit the data to a destination according to a predetermined transport protocol. Examples of encodings may include XML/text, UA Binary and JSON. Examples of transport protocols may include TCP, HTTPS, AMQP and WebSockets.

Operations of the publisher computer 120 are described according to an OPC UA example. For example, the servers 111a-c and the server 122 are OPC UA servers, and the clients 113 and 121 are OPC UA clients. The OPC UA standard specifies the operations of the OPC UA clients and servers, some of which are discussed below.

OPC UA uses an OPC information model to make available the data from IoT devices. OPC UA uses an address space and service model that allows an OPC server to integrate data, alarms and events, and history into its address space, and to provide access to them through a set of services. For example, each of the servers 111a-c maintains its own address space. Each address space is comprised of nodes. The nodes in an address space may identify IoT data, such as variables, and may identify processes. A client may subscribe to a particular node to receive notifications of event occurrences, such as data for variables or alarms. A subscription describes a set of nodes selected by an OPC UA client that the server periodically monitors for the existence of some condition, and for which the OPC UA server sends notifications to the OPC UA client when the condition is detected. For example, when an OPC UA server detects a data change or an event/alarm occurrence, the OPC UA server generates a notification that is transferred to the client by a subscription. The data may be transmitted to an OPC UA client in a session.

OPC UA servers expose their nodes through views. A view may comprise a subset of the nodes of an address space of an OPC UA server that is made available for access by one or more OPC UA clients. An OPC UA client may access an OPC UA server to identify views that it can browse. The available views can be browsed to identify and select nodes, such as to receive IoT data of interest.

The clients 113 and 121 may get data from the servers 111*a-c* according to the client-server communication model described in the OPC UA standard. For example, data is retrieved from the servers 111*a-c* through request and response messages. For example, a request message may be sent by an OPC UA client to an OPC UA server for performing a specific task on one or more nodes in an address space and to have a response message returned by the OPC UA server. The client-server communication model may be used to create subscriptions so the OPC UA client can receive periodic notifications including events, alarms, data changes and program outputs from the OPC UA server.

As is discussed above, the publish sub-process 130 may identify specific data to retrieve from one or more of the servers 111*a-c*. The un-publish sub-process 131 may be used to stop receiving or to stop subscribing to particular data. The publish list sub-process 132 may determine the current data that is subscribed to by a client. Nodes of an OPC UA server may represent processes as well as data. The sub-processes 130-132 may be nodes of the address space of the server 122. A client, such as the client 113, may access a view of the address space of the server 122 to browse the nodes of the server 122 and to select one of the nodes. The server 122 may receive a selection of one of the nodes representing one of the sub-processes 130-132. For example, through the client 113, a user, such as a factory manager, browses the nodes of the server 122 and selects one of the nodes representing one of the sub-processes 130-132. Instead of a user, a computer application may select one of the nodes representing one of the sub-processes 130-132.

Assume the server 122 receives a selection of its publish node representing the publish sub-process 130 to manage data received from the servers 111*a-c* and to manage publishing the data from the publisher computer 120. In addition to receiving the selection of the node for the publish sub-process 130, the server 122 receives information identifying the data to be received from a server of the servers 111*a-c*. The information identifying the data may include an identifier (ID) of data to be retrieved from one of the servers 111*a-c*, and a network address of the computer that will be providing the data. For example, assume data is to be received from the server 111*a*. The information may include a unique node ID of a node in the address space of the server 111*a* that represents the data to be received from the server 111*a*, and an endpoint address of the device or computer providing the data. The nodes of the address spaces of the servers 111*a-c* may be referred to as remote nodes with respect to the publisher computer 120. The endpoint address may be a network address of a computer hosting the server 111*a*.

The server 122 sends a message including a command to the client 121 with the node ID and endpoint address to subscribe to the node identified by the node ID. The client 121, according to the client-server communication model of the OPC UA, creates a subscription for a node identified by the node ID and creates a session to receive the data for the node ID from the server 111*a* if a session does not already exist with the server 111*a*. The client 121 receives the data from the server 111*a* via the session, and the publisher 123 publishes the data in a format compliant with the pub-sub communication model of the OPC UA. For example, the encoder 124 may be a JSON encoder, and the encoder 124 may encode the data to JSON format and send it to a destination using AMQP. The destination may be the cloud-based gateway 115 or any AMQP endpoint.

Assume the server 122 receives a selection of its un-publish node representing the un-publish sub-process 131 to stop receiving particular data from one of the servers 111*a-c*. In addition to receiving the selection of the node for the un-publish sub-process 131, the server 122 receives information identifying the data that is to stop being received and that is to stop being published from the publisher computer 120. For example, the server 122 receives the node ID for the data that is to stop being received and the network address of the server providing the data. The server 122 uses this information to cancel the subscription for the node identified by the node ID. For example, the server 122 instructs the client 121 to cancel the subscription for the node identified by the node ID so the client 121 stops receiving the data for the node. If there are no more subscriptions with the endpoint that provided the data, the client 121 may also cancel the session with the server that was providing the data.

The client 121 maintains a list of the subscriptions to the servers 111*a-c*, so the client 121 can keep track of the data it is receiving from the servers 111*a-c*. The server 122 may request the list from the client 121 or may access the list from a predetermined location. For example, a user or an application may request a list of the subscriptions, and the client 121 or the server 122 may provide the list. For example, the server 122 receives a selection of its publish list node representing the publish list sub-process 132. The selection of the publish list node may be received from the client 113. The server 122 may request the list of nodes that it is currently subscribed to from the client 121, and the client 121 retrieves the list from data storage and provides it to the server 122. The server 122 provides the list to the publisher 123. The publisher 123 may encode the list in JSON and send it back to the requestor using a transport protocol. For example, the list is encoded in JSON and sent in one or more TCP/IP packets to the client 113. For example, the JSON encoded list is included in a payload of a TCP/IP, OPC UA binary packet, and is transmitted to a computer, such as local computer 112, in the local environment 102. If the list is transmitted to be transmitted to a computer in the remote environment 104, the JSON encoded list may be transmitted in an AMQP message. The list may be decoded at the computer receiving the list and may be viewed by a user.

The publisher computer 120 may publish the data received by the client 121 from the servers 111*a-c* according to the pub-sub communication model that is to be specified in a future version of the OPC UA standard. The format may include a specific encoding format and transport protocol for the pub-sub communication model. For example, the publisher 123 may determine a collection of the data to be published. The data may include the data the client 121 received through its subscriptions with the servers 111*a-c*. The data may include monitored variables, OPC UA events, etc. The publisher 123 may create a data set message from the collection of data to be published and from meta data for the data to be published. A network message is created from the data set message and additional information, such as a publisher ID identifying the publishing computer 120, data set class ID, security information and other information. The network message is encoded by the encoder 124 and transmitted to its destination (e.g., JSON encoding and AMQP transport protocol). The destination may include the cloud-based gateway 115, and the cloud-based gateway 115 may send the data to one or more of the remoter computers 114, or the publisher computer 120 may send the network message as an AMQP message directly to one or more of the remoter computers 114.

Figure 3:
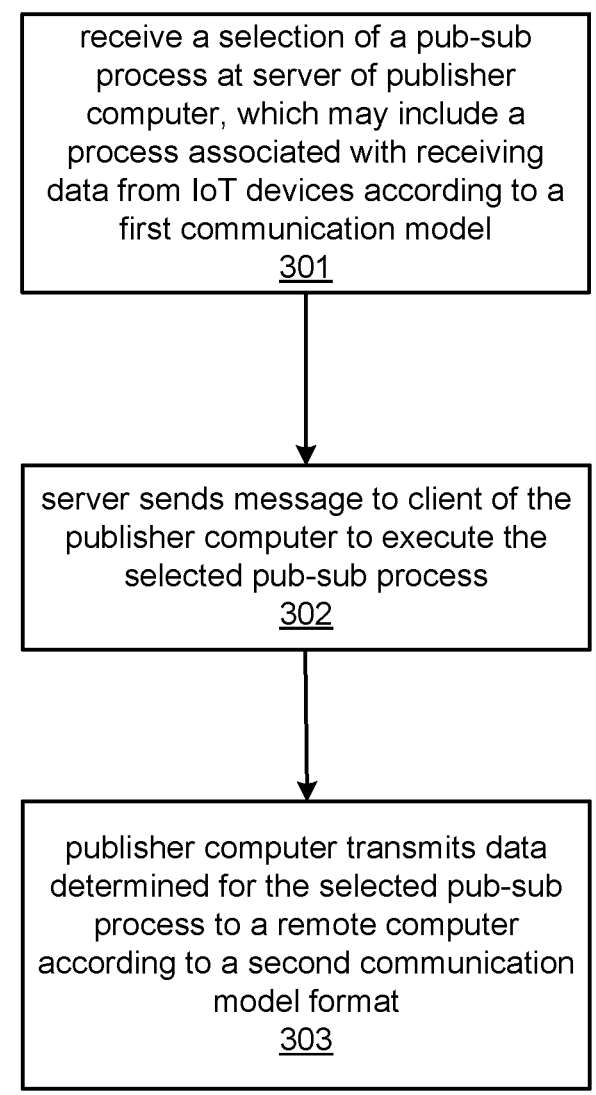
FIG. 3 illustrates a method, according to an example of the present disclosure.

FIG. 3 illustrates a method 300, according to an example of the present disclosure. The method may be performed by the publisher computer 120. At 301, the publisher computer 120 receives a selection of a pub-sub process at a server, such as server 122, hosted on the publisher computer 120. The server 112 may include an OPC UA server. A pub-sub process may include a process associated with receiving data from the IoT devices 110a-c according to a first communication model, and providing the data to one or more destinations according to a second communication model. A communication model may be a protocol that specifies a procedure for getting or providing the data and may specify an encoding format and transport protocol. Examples of the first and second communication models include, respectively, the client-server model specified in an OPC UA standard and a pub-sub model which may be specified in the OPC UA standard. For example, the publisher computer 120 receives data generated by the IoT devices 110a-c from the servers 111a-c that is encoded according to binary encoding format specified in the OPC UA and is transmitted according to TCP/IP transport protocol, which is a specified transport protocol in the OPC UA for the client-server communication model. Also, the publisher computer 120 may transmit JSON encoded data over AMQP for the pub-sub communication model.

Furthermore, examples of the pub-sub process that may be selected at the server 122 of the publisher computer 120 include the publish sub-process 130, the un-publish sub-process 131, and the publish list sub-process 132. The server 122 may be an OPC UA server, and the sub-processes 130-132 may be represented by nodes in the address space of the server 122 that can be browsed and selected. For example, the nodes may include a publish node to retrieve data represented by a node of one of the servers 111a-c, an un-publish node to stop retrieving data represented by a node of one of the servers 111a-c, and a publish list node to get a list of nodes being retrieved from the servers 111a-c. Along with receiving the selection of a pub-sub node or process, the server 122 may also receive a node ID identifying the node for the publish or the un-publish process and a network address of the computer providing the data for the node.

At 302, the server 122, which may be an OPC UA server, of the publisher computer 120 sends a message to the client 121, which may be an OPC UA client hosted on the publisher computer 120, to execute the selected pub-sub process. The client 121 executes the selected pub-sub process. For example, if the publish node is selected at 301, the server 122 may send an instruction to the client 121 to retrieve data for a node identified by a specified node ID and network address. The client 121 may create a subscription with the server, such as one of the servers 111a-c, that has the node in its address space. If the un-publish node is selected, then the client 121 may cancel a subscription for the node identified by the node ID provided with the selection. If the publish list node is selected, then the client 121 may provide a list of the nodes from the servers 111a-c that are currently subscribed to by the client 121.

At 303, the publisher computer 120 transmits data determined for the selected pub-sub process to a remote computer according to the second communication model. For example, if the publish process was selected at 301, the publisher computer 120 may transmit the IoT data received for the selected node to the cloud-based gateway 115 or another computer according to a pub-sub specification specified in an OPC UA standard, and the data may be encoded according to an encoding format and transmitted according to a transport protocol specified for the pub-sub specification, such as JSON encoded data over AMQP. If the un-publish process was selected at 301, then a subscription may be canceled to stop receiving particular data. However, other data represented by nodes of the servers 111a-c that is still subscribed to by the client 121 may be transmitted to the cloud-based gateway 115 or another computer according to the pub-sub specification specified in an OPC UA standard, and the data may be encoded according to an encoding format and transmitted according to a transport protocol specified for the pub-sub specification, such as JSON encoded data over AMQP. If the publish list node is selected at 301, then the list of the nodes from the servers 111a-c that are currently subscribed to may be transmitted to the remote computer requesting the list, e.g., the list is JSON encoded.

Furthermore, at 303, the publisher computer 120 transmits data received from one or more of the serves 111a-c that may be additional data to the data associated with the selected pub-sub process. For example, based on previous selections of nodes received at the server 122 for the publish sub-process 130, the client 121 may have existing subscriptions for nodes of the servers 111a-c. The client 121 receives the data for the nodes through the subscriptions and sessions with the servers 111a-c, and the publisher 123 publishes the data to one or more remote computers according to the pub-sub communication model. The client 121 may continue to receive the data for the nodes through the subscriptions and sessions with the servers 111a-c as new data is generated by the IoT devices 110a-c, and the data may continue to be published from the publisher computer 120 according to the pub-sub communication model. While this process continues, the publisher computer 120 may receive the selection of a pub-sub node of the server 122, such as discussed with respect to 301, and data generated based on the selection may also be published from the publisher computer 120. For example, if a new node is selected at 301 for the publish sub-process 130, the data for the new node may be retrieved by creating a subscription, and is additionally published from the publisher computer 120. However, if a node is selected through the un-publish sub-process 131, the client 121 executes a process to stop receiving data for that node, and thus that data is no longer published from the publisher computer 120, but data received by the client 121 for other nodes is still published from the publisher computer 120. Also, if the publish list sub-process 132 is selected, the list is transmitted to the computer requesting the list, for example, in JSON format, and the publisher computer continues to publish the data for the nodes for which the client 121 has subscriptions.

Figure 4:
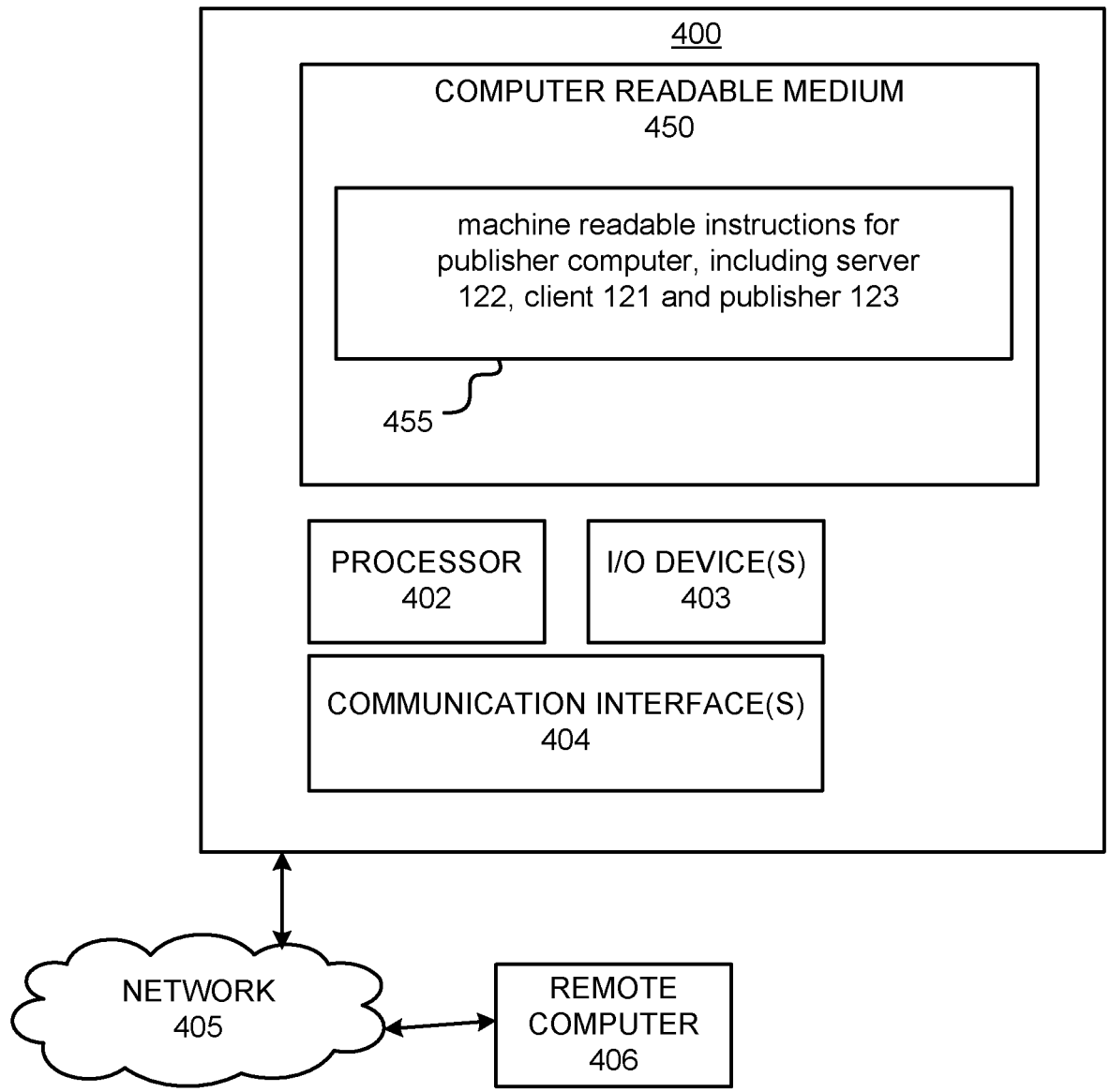
FIG. 4 illustrates a computer platform for the publisher computer, according to an example of the present disclosure.

FIG. 4 shows a computer 400 that may be used as a platform for the publisher computer 120, according to an example of the present disclosure. The computer 400 may include a processor 402 and a computer readable medium 450 on which is stored machine readable instructions 455 that the processor 402 may fetch and execute. The processor 402 may be a semiconductor-based microprocessor, a central processing unit (CPU), an application specific integrated circuit (ASIC), a field-programmable gate array (FPGA), and/or other hardware device. The computer readable medium 450 may be a non-transitory computer readable medium comprised of an electronic, magnetic, optical, or other type of physical storage that stores the machine readable instructions 455. The machine readable instructions may include code for the server 122, client 121, the publisher 123 and for any other processes and operations performed by the publisher computer 120. The computer readable medium 450 may be, for example, Random Access Memory (RAM), an Electrically Erasable Programmable Read-Only Memory (EEPROM), a storage device, an optical disc, and the like. The computer readable medium 450 may be a non-transitory machine-readable storage medium, where the term "non-transitory" does not encompass transitory propagating signals. The processor 402 may include one or more processors. The computer 401 may include one or more input/output (I/O) devices 403, such as a keyboard, mouse, pen, voice input device, touch input device or a display.

The computer 400 may include communication interface(s) 404 that allows the computer 400 to communicate with other computers, such as remote computer 406, which, for example, may include the cloud-based gateway 115, the remote computers 114 and the local computer 112. The communication interface(s) 404 may include, but is not limited to, a modem, a Network Interface Card (NIC), an integrated network interface, a radio frequency transmitter/receiver, an infrared port, a USB connection, or other interfaces. The communication interface(s) 404 may connect with other computers via a wired connection or a wireless connection. The communication interface(s) 404 may include a network interface to connect with other computers, including the remote computer 406, via network 405. The network 405 may comprise one or more of the Internet, an intranet, a Local Area Network (LAN), a wireless LAN (WiLAN), a Wide Area Network (WAN), a Metropolitan Area Network (MAN), a Public Switched Telephone Network (PSTN), a Wireless Personal Area Network (WPAN) and other types of wired and/or wireless communications networks. The network 405 may be a network in a cloud computing environment. The processor 402 may fetch and execute the machine readable instructions 455 to perform operations described herein for the publisher computer 120.

Embodiments and examples are described above, and those skilled in the art will be able to make various modifications to the described embodiments and examples without departing from the scope of the embodiments and examples.

What is claimed is:

1. An Internet of Things (IoT) publisher computer to publish IoT data according to an Open Platform Communications (OPC) Unified Architecture (UA) specified publisher-subscriber (pub-sub) model, the IoT publisher computer comprising:
at least one processor;
at least one non-transitory computer readable medium to store machine readable instructions executable by the at least one processor to:
receive a selection of a publish node, which represents a publish sub-process, from a plurality of nodes in an address space of an OPC UA server of the IoT publisher computer,
wherein the received selection of the publish node includes a node identifier of a remote node in an address space of a remote OPC UA server of an IoT device, and
wherein the remote node represents data from the IoT device to be received according to a client-server communication model that is different than the OPC-US pub-sub model;
in response to receiving the selection of the publish node, send a message, including the node ID of the remote node, from the OPC UA server of the IoT publisher computer to an OPC UA client of the IoT publisher computer to execute the publish sub-process based on the selection;
wherein to execute the publish sub-process, the OPC UA client of the IoT publisher computer:
determines whether a session and subscription already exist between the OPC UA client of the IoT publisher computer and the remote OPC UA server for receiving the data represented by the remote node at the OPC UA client of the IoT publisher computer;
if the session and/or the subscription do not exist, creates the session and/or the subscription; and
receives the data represented by the remote node from the remote OPC UA server based on the node ID;
send the data represented by the remote node that is received at the OPC UA client of the IoT publisher computer to an encoder of the IoT publisher computer;
convert, by the encoder, the data received from the OPC UA client of the IoT publisher computer to a format of the pub-sub model, and
transmit the data in the converted format in a connectionless protocol of the pub-sub model to a remote computer.

2. The IoT publisher computer of claim 1, wherein the plurality of nodes of the OPC UA server comprise an un-publish node representing an un-publish sub-process to stop receiving, at the OPC UA client of the IoT publisher computer, the data represented by the remote node of the remote OPC UA server.

3. The IoT publisher computer of claim 1, wherein
the OPC UA server of the IoT publisher computer includes, in the message sent to the OPC UA client, the node ID and a network address of a computer that is to send the data for the remote node to the OPC UA client of the IoT publisher computer,
wherein the OPC UA client of the IoT publisher computer uses the node ID and the network address to request the remote OPC UA server to send the data for the node of the remote OPC UA server to the OPC UA client.

4. The IoT publisher computer of claim 1, wherein the data for the node of the remote OPC UA server is received at the OPC UA client of the IoT publisher computer, and the encoder converts the received data to a JavaScript Object Notation (JSON) encoding format and transmits the encoded data according to an Advanced Message Queuing Protocol (AMQP) protocol to the remote computer.

5. The IoT publisher computer of claim 2,
wherein to stop receiving the data represented by the remote node, the OPC UA client of the IoT publisher computer uses the node ID and a network address of a computer that is to send the data to execute an operation to stop receiving the data for the remote node.

6. The IoT publisher computer of claim 1, wherein the plurality of nodes of the OPC UA server of the IoT publisher computer includes a publish list node representing a publish list sub-process, and responsive to a selection of the publish list node, the OPC UA client of the IoT publisher computer determines a list of remote nodes of the remote OPC UA server for which the OPC UA client currently has subscriptions; and the IoT publisher computer encodes this list for transmission to the remote computer according to the pub-sub model.

7. The IoT publisher computer of claim 1, wherein the encoder converts the data received from the OPC UA client from an OPC UA binary format over a transmission control protocol (TCP) to a JSON format over AMQP transmission protocol.

8. The IoT publisher computer of claim 1, wherein to receive the selection of the pub-sub node, the OPC UA server of the IoT publisher computer provides a view of the address space for the OPC UA server of the IoT publisher computer to a remote OPC UA client for browsing; and the OPC UA server of the IoT publisher computer receives a selection of one of the plurality of nodes, presented in the view, from the remote OPC UA client.

9. An IoT gateway computer to transmit data from IoT devices to a cloud infrastructure, the IoT gateway computer comprising:

an OPC UA server comprising machine readable instructions stored on a non-transitory computer readable medium and executable by at least one processor to:
        maintain an address space comprising a plurality of nodes representing a publish sub-process, an un-publish sub-process and a publish list sub-process;
        receive, from a remote OPC UA client, a selection of a node of the plurality of nodes representing the publish sub-process,
        wherein the received selection includes a node identifier of a remote node in an address space of a remote OPC UA server connected to an IoT device;
        wherein the remote node represents data from the IoT device to be received according to a client-server communication model that is different than a pub-sub communication model for OPC UA;
    an OPC UA client comprising machine readable instructions stored on the non-transitory computer readable medium and executable by the at least one processor to:
    receive a message, including the node identifier, from the OPC UA server to execute the publish sub-process;
    and execute the publish sub-process, wherein to execute the publish sub-process, the OPC UA client:
        determines whether a session and subscription already exist between the OPC UA client and the remote OPC UA server for receiving the data represented by the remote node at the OPC UA client;
        if the session and/or the subscription do not exist, creates the session and/or the subscription;
        collects the data represented by the remote node from the remote OPC UA Server based on the node identifier;
    a publisher comprising machine readable instructions stored on the non-transitory computer readable medium and executable by the at least one processor to:
    receive, from the OPC UA client, the data represented by the remote node of the remote OPC UA server, is collected by the OPC UA client from the remote OPC UA server;
    encode the data for transmission according to an encoding format and transport protocol for the pub-sub communication model for OPC UA; and
    transmit the data in the converted format in a connection-less protocol of the pub-sub model to the remote OPC UA client.

10. The IoT gateway computer of claim 9, wherein:

the un-publish sub-process is to stop receiving, at the OPC UA client, data represented by a node of a second remote OPC UA server; and the publish list sub-process is to provide a list of nodes being retrieved by the OPC UA client.

11. The IoT gateway computer of claim 10, wherein the OPC UA server further receives, in addition to the selection of the one of the plurality of nodes representing the publish sub-process:

a node identifier (ID) identifying the remote node of the remote OPC UA server; and a network address of a computer that is to send the data for the remote node to the OPC UA client; and the OPC UA client uses the node ID and the network address to request the remote OPC UA server to send the data represented by the remote node to the OPC UA client.

12. The IoT gateway computer of claim 9, wherein to encode the data for transmission according to the encoding format and transport protocol for the pub-sub communication model, the publisher converts the data represented by the remote node from-OPC UA binary of OPC-TCP protocol to a JSON encoding format and an AMQP protocol.

13. The IoT gateway computer of claim 10, wherein the OPC UA server receives a selection of one of the plurality of nodes representing the un-publish sub-process, and the OPC UA server further receives:

a node ID identifying the node of the second remote OPC UA server; and a network address of a computer that is sending the data represented by the node of the second remote OPC UA server to the OPC UA client; and the OPC UA client uses the node ID and the network address to execute an operation to stop receiving the data for the node of the second remote OPC UA server at the OPC UA client.

14. The IoT gateway computer of claim 10, wherein the OPC UA server receives a selection of one of the plurality of nodes representing the publish list sub-process, and the OPC UA client determines the list of nodes for which the OPC UA client currently has subscriptions; and the publisher encodes this list according to a JSON encoding format and transmits the encoded list data according to an AMQP protocol to a computer requesting the list.

15. A method comprising:

receiving a selection of one of a plurality of nodes in an address space of an OPC UA server of a publisher computer, wherein the plurality of nodes each represent a different sub-process of a plurality of sub-processes comprising:

a publish sub-process to receive, at an OPC UA client of the publisher computer, data represented by a node of a first remote server, wherein the data is associated with an IoT device connected to the remote server;

an un-publish sub-process to stop receiving, at the OPC UA client, data represented by a node of the remote server; and a publish list sub-process to provide a list of nodes being retrieved by the OPC UA client from the plurality of remote servers;

responsive to the received selection including the node of the OPC UA server representing the publish sub-process, and a node identifier of the node of the first remote server, sending a message, including the node identifier, from the OPC UA server of the publisher computer to the OPC UA client of the publisher computer to execute the publish sub-process to receive the data represented by the node of the first remote server wherein executing the publish sub-process comprises:
  determining whether a session and subscription already exist between the OPC UA client and the first remote OPC UA server for receiving the data represented by the node of the first remote server at the OPC UA client of the publisher computer;
  if the session and/or the subscription do not exist, creating the session and/or the subscription; and
  receiving, at the OPC UA client of the publisher computer, the data represented by the node of the first remote server, based on the node identifier, according to a client-server communication model;
encoding the data represented by the node of the first remote server received at the OPC UA client to an encoding format and transport protocol for a pub-sub communication model for transmission to a remote computer; wherein the client-server communication model and the pub-sub communication model comprise different communication models specified in an OPC UA standard; and transmitting the data in the converted format in a connectionless protocol of the pub-sub model to the remote computer.

16. The method of claim 15, comprising:

receiving, at the OPC UA server, a selection of one of the plurality of nodes representing the un-publish sub-process, a node ID identifying the node of the second remote OPC UA server; and a network address of a computer that is sending the data represented by the node of the second remote OPC UA server to the OPC UA client; and executing, by the OPC UA client and using the node ID and the network address, an operation to stop receiving the data for the node of the second remote OPC UA server at the OPC UA client.

17. The method of claim 15, comprising:

receiving, at the OPC UA server, a selection of one of the plurality of nodes representing the publish list sub-process; and executing the publish list sub-process to determine the list of nodes for which the OPC UA client currently has subscriptions.

* * * * *